(12) United States Patent
Chung

(10) Patent No.: US 12,109,989 B2
(45) Date of Patent: Oct. 8, 2024

(54) BRAKE APPARATUS FOR VEHICLE

(71) Applicant: HYUNDAI MOBIS CO., LTD., Seoul (KR)

(72) Inventor: Soon Oh Chung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 358 days.

(21) Appl. No.: 17/691,227

(22) Filed: Mar. 10, 2022

(65) Prior Publication Data
US 2023/0150468 A1   May 18, 2023

(30) Foreign Application Priority Data
Nov. 17, 2021   (KR) .................. 10-2021-0158534

(51) Int. Cl.
| | | |
|---|---|---|
| *B60T 13/74* | (2006.01) | |
| *B60T 1/00* | (2006.01) | |
| *B60T 1/06* | (2006.01) | |
| *F16D 55/226* | (2006.01) | |
| *F16D 65/18* | (2006.01) | |

(Continued)

(52) U.S. Cl.
CPC ............ *B60T 13/746* (2013.01); *B60T 1/005* (2013.01); *B60T 1/065* (2013.01); *F16D 55/226* (2013.01); *F16D 65/18* (2013.01); *F16D 2121/24* (2013.01); *F16D 2125/40* (2013.01); *F16D 2125/48* (2013.01); *F16D 2127/06* (2013.01)

(58) Field of Classification Search
CPC ........ B60T 13/746; B60T 1/065; B60T 1/005; B60T 13/748; F16D 55/226; F16D 65/18; F16D 2125/40; F16D 65/14; F16D 2125/48; F16D 2127/06; F16D 2121/24
See application file for complete search history.

(56) References Cited

U.S. PATENT DOCUMENTS

| | | | |
|---|---|---|---|
| 10,823,242 B2 * | 11/2020 | Choi .................... | B60T 13/741 |
| 2021/0016758 A1 * | 1/2021 | Choi .................... | F16D 55/226 |

(Continued)

FOREIGN PATENT DOCUMENTS

| | | |
|---|---|---|
| EP | 2907709 A1 | 8/2015 |
| KR | 10-2010-0098846 A | 9/2010 |

OTHER PUBLICATIONS

German Patent No. DE 10355224 to Takahashi published on Jun. 3, 2004.*

(Continued)

*Primary Examiner* — Pamela Rodriguez
(74) *Attorney, Agent, or Firm* — NovoTechIP International PLLC

(57) ABSTRACT

A brake apparatus for a vehicle may include: a drive unit configured to generate driving power; a transmission gear configured to be rotated by the driving power transmitted from the drive unit; a piston configured to move forward or rearward in conjunction with the rotation of the transmission gear and press or release a pad in a direction in which the piston moves forward or rearward; a parking gear configured to engage with the transmission gear and rotate in conjunction with the rotation of the transmission gear; and a restriction unit installed to be movable toward the parking gear and configured to restrict the rotation of the parking gear by being inserted into the parking gear during parking braking.

13 Claims, 12 Drawing Sheets

(51) Int. Cl.
  *F16D 121/24*  (2012.01)
  *F16D 125/40*  (2012.01)
  *F16D 125/48*  (2012.01)
  *F16D 127/06*  (2012.01)

(56) References Cited

U.S. PATENT DOCUMENTS

| | | | |
|---|---|---|---|
| 2023/0166697 A1* | 6/2023 | Boo | F16D 63/006 |
| | | | 188/72.3 |
| 2023/0175564 A1* | 6/2023 | Gerber | B60T 13/741 |
| | | | 188/72.1 |
| 2023/0286484 A1* | 9/2023 | Shin | F16D 65/18 |

OTHER PUBLICATIONS

Office Action issued on Jun. 3, 2022 in the corresponding German Patent Application No. 102022102319.2.

* cited by examiner

BRAKE APPARATUS FOR VEHICLE

CROSS-REFERENCE TO RELATED APPLICATIONS

This application claims priority from and the benefit of Korean Patent Application No. 10-2021-0158534, filed on Nov. 17, 2021, which is hereby incorporated by reference for all purposes as if set forth herein.

BACKGROUND

1. Technical Field

Exemplary embodiments of the present disclosure relate to a brake apparatus for a vehicle, and more particularly, to a brake apparatus for a vehicle that generates a braking force by converting an operating force applied to a pedal by a driver into an electrical signal.

2. Discussion of Related Art

In general, a brake apparatus for a vehicle refers to an apparatus for braking a vehicle by using a frictional force between a pad and a disc which is generated when the pad and the disc come into close contact with each other as a piston is pushed by driving power.

Among the brake apparatuses, an electromechanical brake (EMB) refers to an apparatus that has a motor-driven actuator mounted directly on a caliper and generates a braking force by pressing a piston through a mechanism such as a gear or a screw without using a hydraulic pressure. The EMB is advantageous in that the EMB may perform implement additional functions such as ABS, ESC, TCS, and AEB as well as general main braking because the EMP may perform active braking and independent braking for each wheel, and implement higher performance because there is no delay in transmitting a hydraulic pressure.

The EMB in the related art ensures quick responsiveness and high efficiency of the piston by means of a ball screw. However, because the ball screw cannot perform self-locking capable of restricting a rotation of the ball screw because of the structural nature of the ball screw, there is a problem in that a braking force is arbitrarily eliminated by a repulsive force between the pad and the piston when a supply of power to a motor is cut off.

The background technology of the present disclosure is disclosed in Korean Patent Application Laid-Open No. 10-2010-0098846 (published on Sep. 10, 2010 and entitled 'Disc Brake Having Parking Function').

SUMMARY

Various embodiments are directed to a brake apparatus for a vehicle, which is capable of stably maintaining a parking braked state.

In an embodiment, a brake apparatus for a vehicle includes: a drive unit configured to generate a driving power; a transmission gear configured to be rotated by the driving power transmitted from the drive unit; a piston configured to (1) move along a first axis in response to a rotation of the transmission gear and (2) press or release a pad depending on a movement direction of the piston; a parking gear engaged with the transmission gear, and configured to be rotated in response to the rotation of the transmission gear; and a restriction unit configured to move toward and engage with the parking gear to restrict a rotation of the parking gear.

In addition, the transmission gear may include: a first transmission gear configured to be rotated with an output shaft of the drive unit; a second transmission gear engaged with the first transmission gear, and configured to be rotated in response to a rotation of the first transmission gear; and a third transmission gear engaged with the second transmission gear, and configured to be rotated in response to a rotation of the second transmission gear and transmit a rotational force to the piston.

In addition, the parking gear may engage with the second transmission gear.

In addition, a diameter of the parking gear may be smaller than a diameter of the second transmission gear.

In addition, a diameter of the parking gear may correspond to a diameter of the first transmission gear.

In addition, the parking gear may include: a body unit; a toothed unit protruding from an outer peripheral surface of the body unit and engaged with the second transmission gear; and an insertion structure concavely recessed into the body unit, wherein the restriction unit is inserted into the insertion structure.

In addition, the restriction unit may include: a parking drive unit configured to generate an electromagnetic force; a rod slidably movable in the parking drive unit, and configured to move to a first direction when the electromagnetic force is supplied thereto; a restoration unit positioned between the rod and the parking drive unit, and configured to move the rod to a second direction when a supply of the electromagnetic force is discontinued; and a stopper configured to be inserted into the parking gear when the rod moves to the second direction. parking gear In addition, the restriction unit may further include a rotation prevention unit configured to prevent a rotation of the rod relative to the parking drive unit.

In addition, the rotation prevention unit may have a polygonal cross-section and surrounds an outer surface of the rod.

In addition, the stopper may have a polygonal cross-sectional shape.

In addition, the restriction unit may further include an insertion guide unit configured to guide the insertion of the stopper unit into the parking gear.

In addition, the insertion guide unit may be positioned at an edge of an end portion of the stopper and inclined at a predetermined angle.

In addition, the restoration unit may be elastically deformable in a longitudinal direction thereof.

In addition, the piston may include: a ball screw connected to the transmission gear configured to rotate; a ball nut configured to rectilinearly reciprocate in a longitudinal direction of the ball screw in response to a rotation of the ball screw; and a rolling element positioned between and being in rollable contact with the ball screw and the ball nut.

According to the brake apparatus for a vehicle according to the present disclosure, the restriction unit may prevent the piston from being arbitrarily separated from the pad part and thus inhibit a loss of braking force even though the operation of the drive unit is released during the parking braking.

In addition, according to the brake apparatus for a vehicle according to the present disclosure, the parking gear may engage with the second transmission gear and thus be prevented from interfering with an adjacent component such as an ECU installed at the periphery of a driving shaft of the drive unit.

In addition, according to the brake apparatus for a vehicle according to the present disclosure, the diameter of the parking gear may be smaller than the diameter of the second transmission gear, which makes it possible to reduce a magnitude of a load applied to the restriction unit when the restriction unit restricts the rotation.

DETAILED DESCRIPTION

Figure 1:
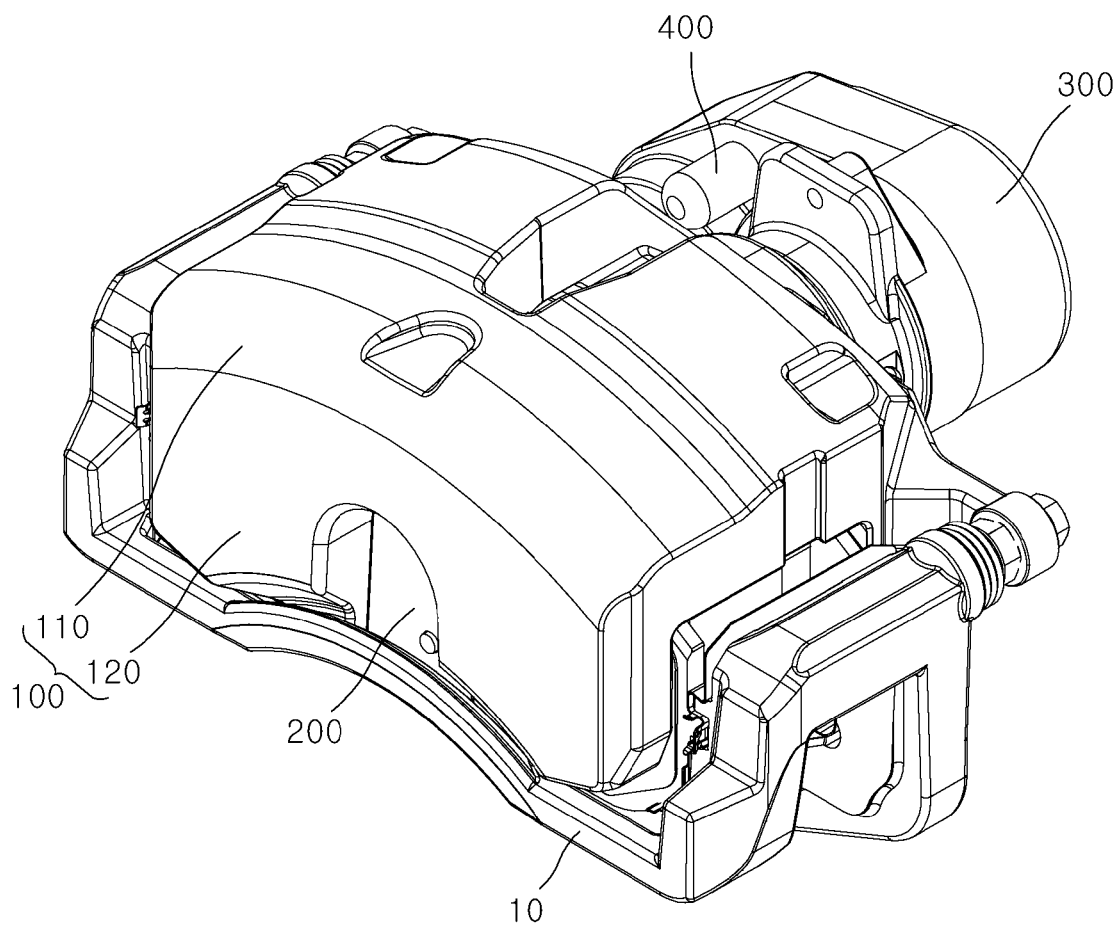
FIG. 1 is a perspective view schematically illustrating a configuration of a brake apparatus for a vehicle according to an embodiment of the present disclosure.

Hereinafter, a brake apparatus for a vehicle will be described with reference to the accompanying drawings through various embodiments.

Here, thicknesses of lines, sizes of constituent elements, or the like illustrated in the drawings, may be exaggerated for clarity and convenience of description. In addition, the terms used below are defined in consideration of the functions thereof in the present disclosure and may vary depending on the intention of a user or an operator or a usual practice. Therefore, such terms should be defined based on the entire contents of the present specification.

In addition, in the present specification, when one constituent element is referred to as being "connected to (or coupled to)" another constituent element, the constituent elements can be "directly connected to (coupled to)" each other, and can also be "indirectly connected to (coupled to)" each other with other elements interposed therebetween. Unless explicitly described to the contrary, the word "comprise (or include)" and variations such as "comprises (or includes)" or "comprising (or including)" will be understood to imply the further inclusion of stated elements, not the exclusion of the stated elements.

In addition, throughout the specification, the same reference numerals denote the same constituent elements. Even though the same or similar reference numerals are not mentioned or described with reference to specific drawings, the same or similar reference numerals may be described with reference to the other drawings. In addition, even though there are parts denoted by no reference numeral in specific drawings, the parts may be described with reference to the other drawings. In addition, the numbers, shapes, sizes, relative differences in sizes, and the like of the detailed constituent elements illustrated in the drawings of the present application are set for convenience of understanding, do not limit the embodiments, and may be variously implemented.

Figure 2:
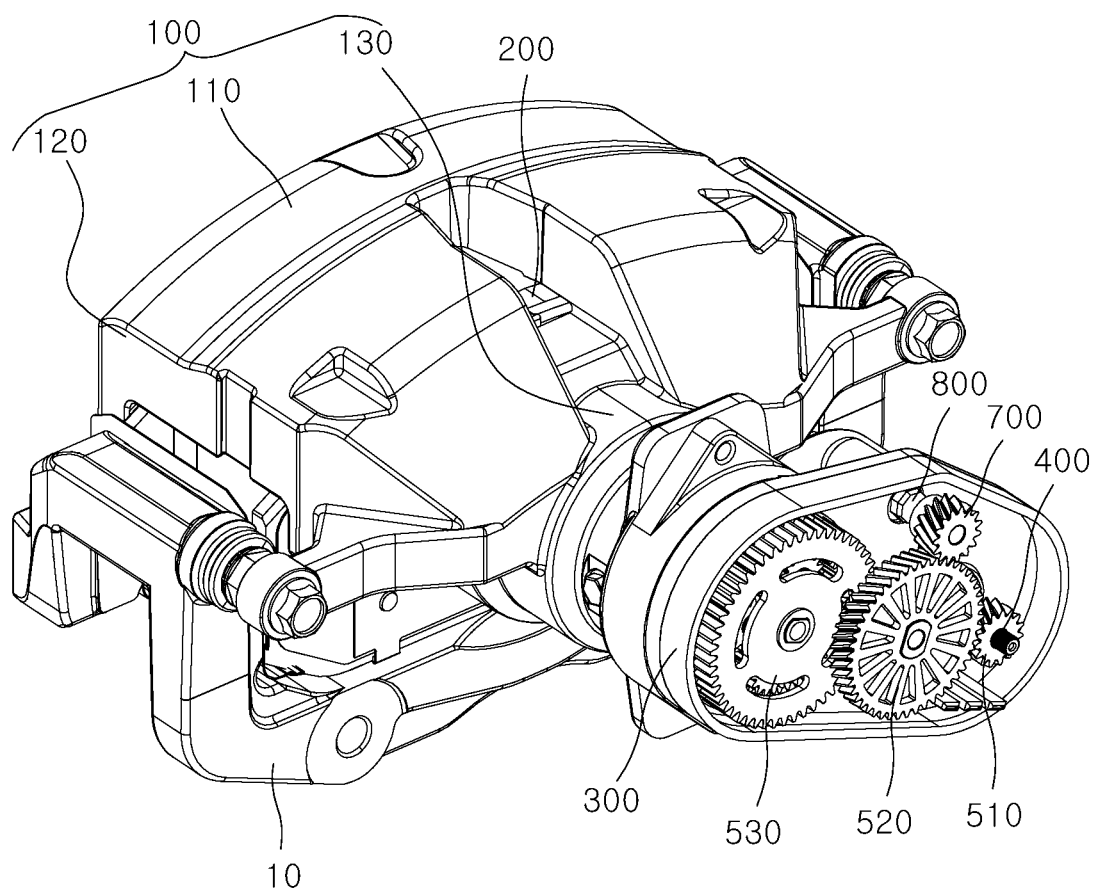
FIG. 2 is a perspective view illustrating the configuration of the brake apparatus for a vehicle according to the embodiment of the present disclosure when viewed at a point in time different a point in time illustrated in FIG. 1.
Figure 3:
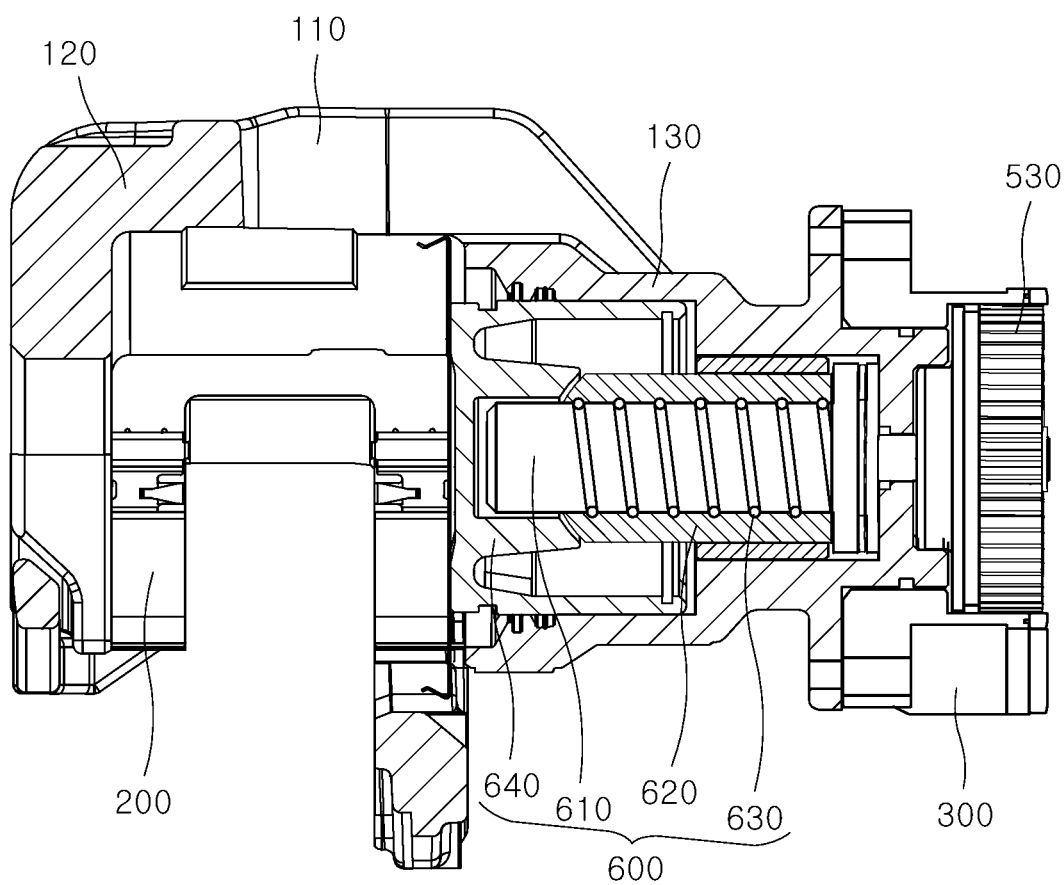
FIG. 3 is a cross-sectional view schematically illustrating the configuration of the brake apparatus for a vehicle according to the embodiment of the present disclosure.
Figure 4:
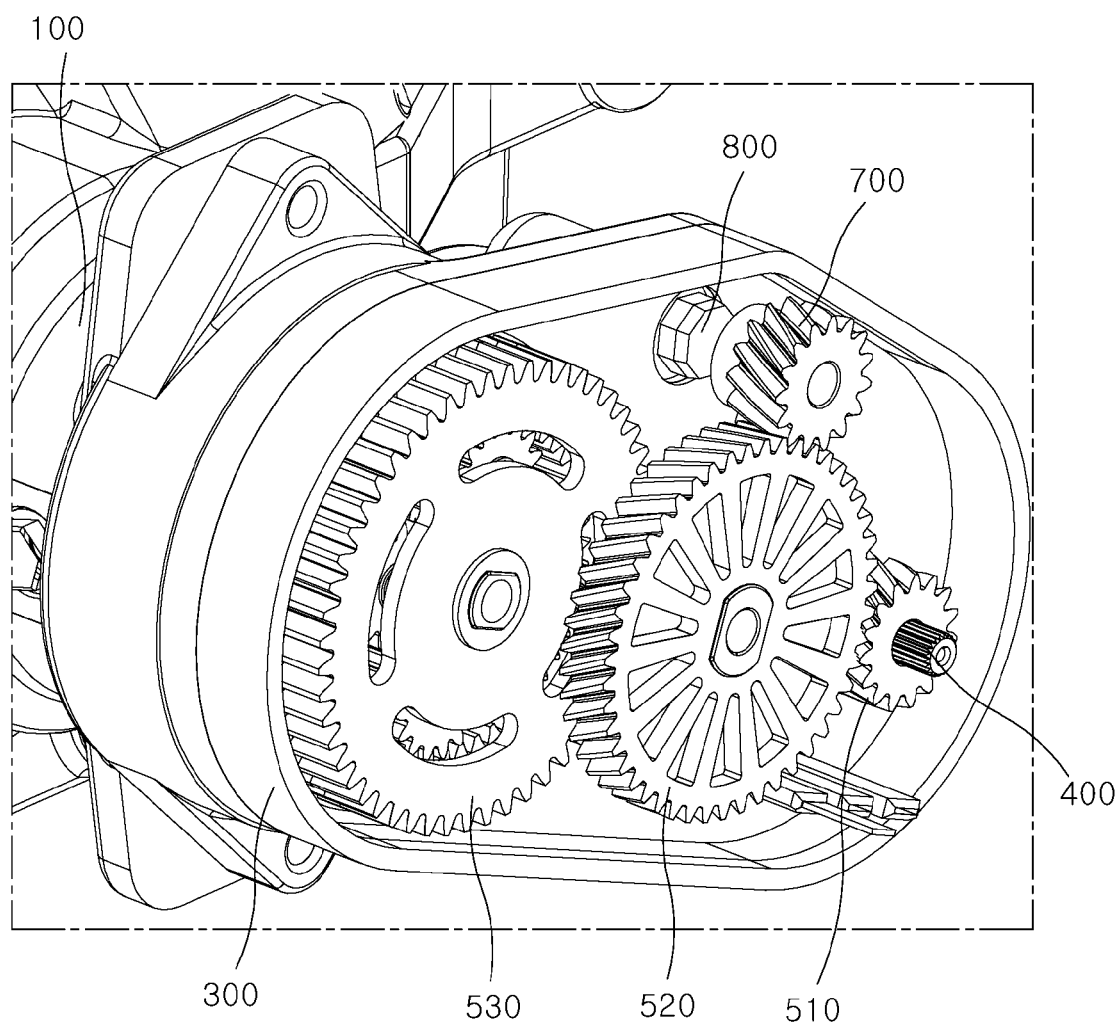
FIG. 4 is an enlarged view schematically illustrating the configuration of the brake apparatus for a vehicle according to the embodiment of the present disclosure.

FIG. 1 is a perspective view schematically illustrating a configuration of a brake apparatus for a vehicle according to an embodiment of the present disclosure, FIG. 2 is a perspective view illustrating the configuration of the brake apparatus for a vehicle according to the embodiment of the present disclosure when viewed at a point in time different a point in time illustrated in FIG. 1, FIG. 3 is a cross-sectional view schematically illustrating the configuration of the brake apparatus for a vehicle according to the embodiment of the present disclosure, and FIG. 4 is an enlarged view schematically illustrating the configuration of the brake apparatus for a vehicle according to the embodiment of the present disclosure.

Referring to FIGS. 1 to 4, a brake apparatus 1 for a vehicle according to an embodiment of the present disclosure includes a caliper body part 100, pad parts 200, a housing 300, a drive unit 400, a transmission gear 500, a piston 600, a parking gear 700, and a restriction unit 800.

The caliper body part 100 is fixed to a vehicle body by means of a torque member 10 and supports the pad parts 200, the housing 300, and the piston 600 which will be described below. The caliper body part 100 is coupled to the torque member 10 by means of guide pins connected to two opposite sides thereof so as to be slidable in a direction parallel to an axial direction of a brake disc. The caliper body part 100 is slidably supported on the torque member 10 by means of the guide pins connected to the two opposite sides thereof. The caliper body part 100 is slid in the direction parallel to the axial direction of the brake disc (not illustrated) by a reaction force generated when the piston 600 to be described below presses the pad parts 200.

The caliper body part 100 according to the embodiment of the present disclosure includes a bridge unit 110, a finger unit 120, and a cylinder unit 130.

The bridge unit 110 defines an upper external appearance of the caliper body part 100. The bridge unit 110 according to the embodiment of the present disclosure may be provided in the form of a plate disposed such that an inner surface thereof is spaced apart from an outer peripheral surface of the brake disc at a predetermined interval and faces the outer peripheral surface of the brake disc. The specific shape and area of the bridge unit 110 may be variously changed in design depending on the size or the like of the brake disc.

The finger unit 120 defines a front external appearance of the caliper body part 100 and presses or releases the pad parts 200 to be described below in conjunction with the sliding of the caliper body part 100. The finger unit 120 according to the embodiment of the present disclosure perpendicularly extends downward from a front end of the bridge unit 110. The finger unit 120 is disposed such that an inner surface thereof faces one of the pair of pad parts 200 disposed at an outer side based on the brake disc in a width direction of the vehicle.

The cylinder unit 130 defines a rear external appearance of the caliper body part 100 and supports the piston 600 to be described below so that the piston 600 is movable. The cylinder unit 130 according to the embodiment of the present disclosure perpendicularly extends downward from a rear end of the bridge unit 110. The cylinder unit 130 has a hollow cylindrical shape opened at one side thereof. The cylinder unit 130 is disposed such that the opened side faces one of the pair of pad parts 200 disposed at an inner side based on the brake disc in the width direction of the vehicle.

The pad parts 200 are disposed to face the brake disc that rotates together with a wheel of the vehicle. The pair of pad parts 200 is disposed to face two opposite surfaces of the brake, respectively, disc with the brake disc interposed therebetween. The pad parts 200 are supported on the caliper body part 100 so as to be slidable in the direction parallel to a central axis of the brake disc. The pad parts 200 are brought into contact with the brake disc by a pressing force applied by the caliper body part 100 and the piston 600 to be described below or separated from the brake disc, thereby generating or eliminating the braking force for braking the vehicle. A friction pad made of a material such as rubber with a high frictional coefficient may be attached to one surface of the pad part 200 facing the brake disc. The specific shape of the pad part 200 is not limited to the shape illustrated in FIGS. 1 to 4 and may be variously changed in design within the technical spirit of the brake pad that applies the braking force to the vehicle by coming into contact with the brake disc.

The housing 300 is coupled to the caliper body part 100 and entirely supports the drive unit 400, the transmission gear 500, the parking gear 700, and the restriction unit 800, which will be described below. The housing 300 according to the embodiment of the present disclosure is coupled to a rear surface of the caliper body part 100, more specifically, a rear surface of the cylinder unit 130. The housing 300 may be detachably coupled to the cylinder unit 130 by bolting or the like or integrally coupled to the cylinder unit 130 by welding or the like. The housing 300 has therein a vacant space in which the drive unit 400, the transmission gear 500, the parking gear 700, and the restriction unit 800 may be installed. The housing 300 may be openable and closable so that the components installed in the housing 300 may be easily installed and managed.

The drive unit 400 is installed at one side of the housing 300 and generates the driving power by being supplied with power from the outside. The drive unit 400 may be electrically connected to a battery or the like of the vehicle and supplied with power. The examples of the drive unit 400 according to the embodiment of the present disclosure may include various types of electric motors that generate a rotational force by being supplied with power.

The transmission gear 500 is rotated by the driving power transmitted from the drive unit 400 and transmits the driving power, generated by the drive unit 400, to the piston 600 to be described below.

The transmission gear 500 according to the embodiment of the present disclosure includes a first transmission gear 510, a second transmission gear 520, and a third transmission gear 530.

The first transmission gear 510 is connected to an output shaft of the drive unit 400 and rotated together with the output shaft of the drive unit 400. The first transmission gear 510 according to the embodiment of the present disclosure may be provided in the form of a hollow helical or spur gear having teeth formed on an outer peripheral surface thereof. The first transmission gear 510 is supported in a state in which the output shaft of the drive unit 400 is inserted into a central portion of the first transmission gear 510. A central axis of the first transmission gear 510 is disposed coaxially with the output shaft of the drive unit 400. When the drive unit 400 operates, the first transmission gear 510 rotates at the same angular velocity as the output shaft of the drive unit 400.

The second transmission gear 520 engages with the first transmission gear 510 and rotates in response to the rotation of the first transmission gear 510. The second transmission gear 520 according to the embodiment of the present disclosure may be provided in the form of a hollow helical or spur gear having teeth formed on an outer peripheral surface thereof. The second transmission gear 520 engages with the first transmission gear 510. In this case, the outer peripheral surface of the second transmission gear 520 may engage directly with the outer peripheral surface of the first transmission gear 510 or engage with the first transmission gear 510 by means of a separate small-diameter gear. A central axis of the second transmission gear 520 is disposed in parallel with the central axis of the first transmission gear 510. When the first transmission gear 510 rotates, the second transmission gear 520 transmits a rotational force while rotating in a direction opposite to the rotation direction of the first transmission gear 510. A diameter of the second transmission gear 520 is larger than a diameter of the first transmission gear 510. Therefore, when the first transmission gear 510 rotates, the second transmission gear 520 may rotate at a lower angular velocity than the first transmission gear 510, thereby increasing a magnitude of the rotational force transmitted from the first transmission gear 510.

The third transmission gear 530 engages with the second transmission gear 520. The third transmission gear 530 transmits the rotational force to the piston 600 to be described below while rotating in response to the rotation of the second transmission gear 520. The third transmission gear 530 according to the embodiment of the present disclosure may be provided in the form of a hollow helical or spur gear having teeth formed on an outer peripheral surface thereof. The third transmission gear 530 engages with the second transmission gear 520. In this case, the outer peripheral surface of the third transmission gear 530 may engage directly with the outer peripheral surface of the second transmission gear 520 or engage with the second transmission gear 520 by means of a separate small-diameter gear. A central axis of the third transmission gear 530 is disposed in parallel with the central axis of the second transmission gear 520. When the second transmission gear 520 rotates, the third transmission gear 530 transmits the rotational force while rotating in a direction opposite to the rotation direction of the second transmission gear 520 or rotating in a direction identical to the rotation direction of the first transmission gear 510. A central shaft of the third transmission gear 530 is connected to the piston 600 to be described below and may transmit the rotational force to the piston 600 while rotating about the central shaft. A diameter of the third transmission gear 530 is larger than the diameter of the second transmission gear 520. Therefore, when the second transmission gear 520 rotates, the third transmission gear 530 may rotate at a lower angular velocity than the second transmission gear 520, thereby increasing the magnitude of the rotational force to be transmitted to the piston 600.

The piston 600 is installed in the caliper body part 100 so as to be movable along an axis. The piston 600 moves forward or rearward in response to the rotation of the transmission gear 500. The piston 600 applies or releases the braking force by pressing the pad parts 200 against the brake disc or releasing the pad parts 200 in the direction in which the piston 600 moves forward or rearward.

The piston 600 according to the embodiment of the present disclosure includes a ball screw 610, a ball nut 620, rolling elements 630, and a piston member 640.

The ball screw 610 is connected to the transmission gear 500 and rotated. The ball screw 610 according to the embodiment of the present disclosure has an approximately rod shape and is rotatably installed in the cylinder unit 130. A longitudinal direction of the ball screw 610 is disposed in parallel with a longitudinal direction of the cylinder unit 130. A rear end of the ball screw 610 is connected to the third transmission gear 530, such that the ball screw 610 axially rotates about a central axis thereof when the third transmission gear 530 rotates. A groove is formed in an outer peripheral surface of the ball screw 610, and one peripheral portion of each of the rolling elements 630 to be described below is seated in the groove. The groove extends in a spiral shape in the longitudinal direction of the ball screw 610 and defines a circulation route for the rolling elements 630.

The ball nut 620 rectilinearly reciprocates in the longitudinal direction of the ball screw 610 in response to the rotation of the ball screw 610. The ball nut 620 according to the embodiment of the present disclosure may have a hollow cylindrical shape that surrounds the outer peripheral surface of the ball screw 610. An inner peripheral surface of the ball nut 620 faces an outer peripheral surface of the ball screw 610 and is spaced apart from the outer peripheral surface of the ball screw 610 at a predetermined interval. When the ball screw 610 rotates, the ball nut 620 rectilinearly reciprocates forward or rearward in the longitudinal direction of the ball screw 610 by means of the circulation of the rolling elements 630 to be described below. A groove may be formed in the inner peripheral surface of the ball nut 620, and the other peripheral portion of each of the rolling elements 630 may be seated in the groove. The groove extends in a spiral shape in the longitudinal direction of the ball nut 620 and defines a circulation route for the rolling elements 630.

The rolling element 630 is disposed between the ball screw 610 and the ball nut 620 and has two opposite sides in rollable contact with the ball screw 610 and the ball nut 620. The rolling element 630 according to the embodiment of the present disclosure has an approximately spherical shape and is installed between the ball screw 610 and the ball nut 620. The peripheral portions of the two opposite sides of the rolling element 630 are respectively in rollable contact with the groove formed in the outer peripheral surface of the ball screw 610 and the groove formed in the inner peripheral surface of the ball nut 620. When the ball screw 610 rotates, the rolling elements 630 convert the rotational motion of the ball screw 610 into the rectilinear reciprocating motion of the ball nut 620 while circulating along the grooves.

The piston member 640 presses or releases the pad parts 200 in the movement direction while rectilinearly reciprocating together with the ball nut 620. The piston member 640 according to the embodiment of the present disclosure is slidably installed in the cylinder unit 130. A rear end of the piston member 640 is integrally coupled to a front end of the ball nut 620, such that the piston member 640 rectilinearly reciprocates together with the ball nut 620 in the longitudinal direction of the cylinder unit 130. When the ball nut 620 moves forward, a front end of the piston member 640 comes into contact with the pad part 200 and presses the pad part 200 against the brake disc. When the ball nut 620 moves rearward, the piston member 640 separates from the pad parts 200 and releases the pad part 200.

The parking gear 700 engages with the transmission gear 500 and rotates in response to the rotation of the transmission gear 500. The parking gear 700 according to the embodiment of the present disclosure may engage with the second transmission gear 520. Therefore, the parking gear 700 may be prevented from interfering with an adjacent component such as an ECU installed at the periphery of a driving shaft of the drive unit 400. In this case, a diameter of the parking gear 700 is smaller than the diameter of the second transmission gear 520. More specifically, the parking gear 700 may have a size corresponding to the diameter of the first transmission gear 510 and rotate at the same angular velocity as the first transmission gear 510. Therefore, the parking gear 700 may rotate and decrease the magnitude of the rotational force increased by the second transmission gear 520, thereby reducing a magnitude of a load applied to the restriction unit 800 to be described below when the restriction unit 800 restricts a rotation of the parking gear 700.

Figure 5:
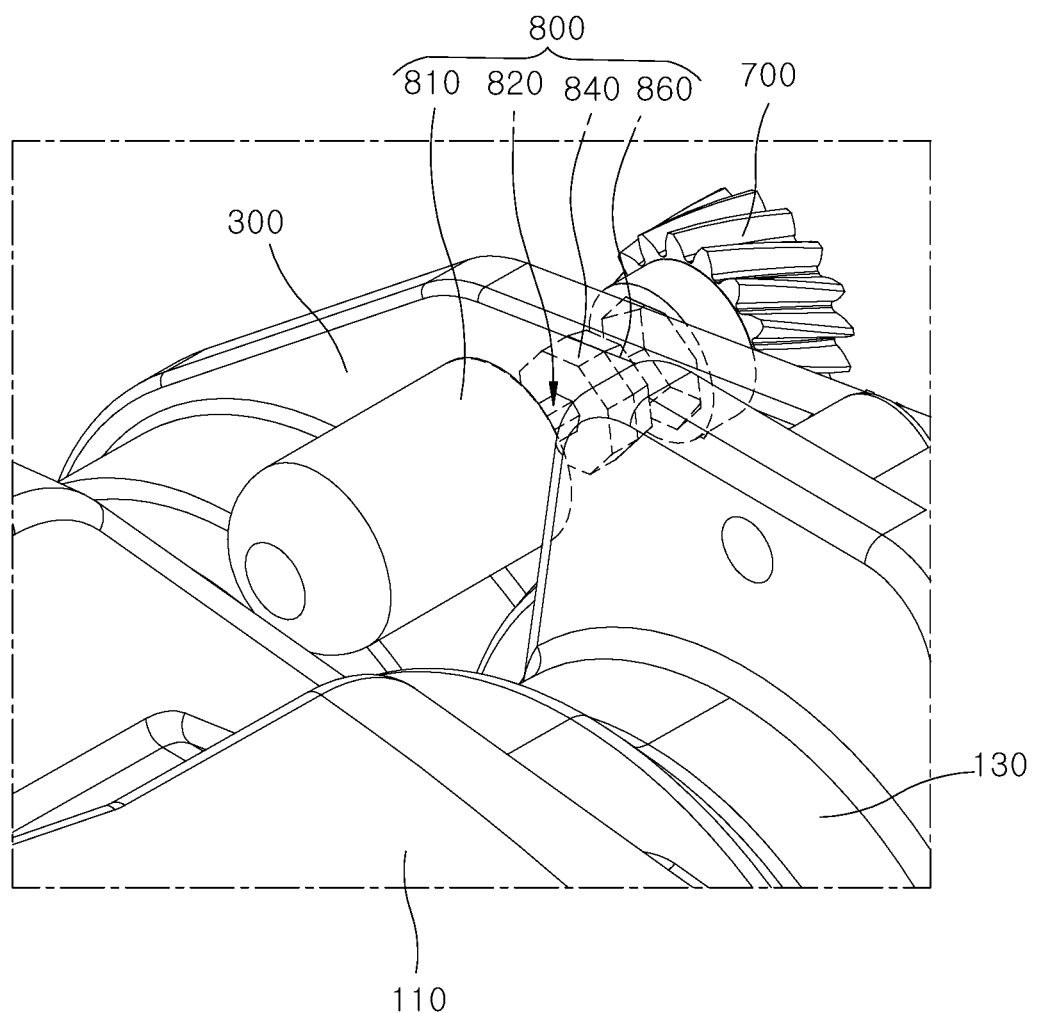
FIG. 5 is an enlarged view schematically illustrating configurations of a parking gear and a restriction unit according to the embodiment of the present disclosure.
Figure 6:
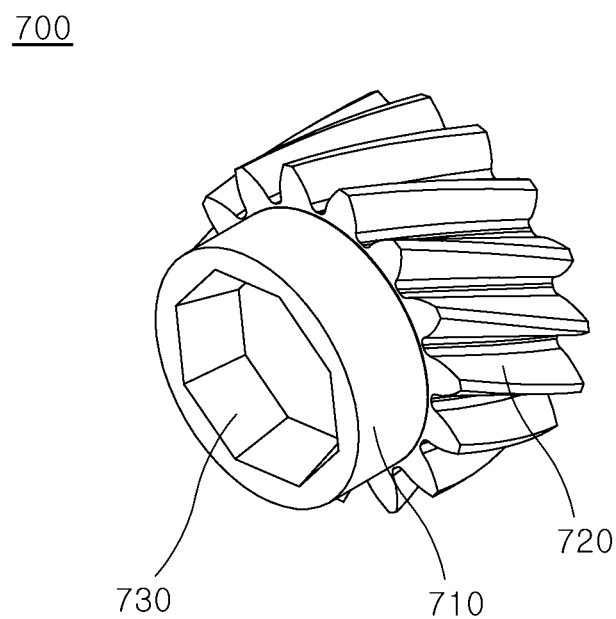
FIG. 6 is a perspective view schematically illustrating the configuration of the parking gear according to the embodiment of the present disclosure.

FIG. 5 is an enlarged view schematically illustrating configurations of the parking gear and the restriction unit according to the embodiment of the present disclosure, and FIG. 6 is a perspective view schematically illustrating the configuration of the parking gear according to the embodiment of the present disclosure.

Referring to FIGS. 5 and 6, the parking gear 700 according to the embodiment of the present disclosure includes a body unit 710, a toothed unit 720, and an insertion structure 730.

The body unit 710 defines a schematic external appearance of the parking gear 700 and provides a space in which the toothed unit 720 and the insertion structure 730, which will be described below, may be formed. The body unit 710 according to the embodiment of the present disclosure may have an approximately cylindrical shape. An outer peripheral surface of the body unit 710 may face the outer peripheral surface of the second transmission gear 520 and is spaced apart from the outer peripheral surface of the second transmission gear 520 at a predetermined interval. A central axis of the body unit 710 is disposed in parallel with the central axis of the second transmission gear 520. A shaft or the like extending from the housing 300 may be inserted into a front portion of the body unit 710, such that the body unit 710 may be rotatably supported on the second transmission gear 520.

The toothed unit 720 protrudes from the body unit 710 and engages with the second transmission gear 520. The toothed unit 720 according to the embodiment of the present disclosure may protrude perpendicularly from the outer peripheral surface of the body unit 710 in a radial direction of the body unit 710 and have gear teeth extending in a circumferential direction of the body unit 710. The toothed unit 720 engages with the second transmission gear 520 and rotates the body unit 710 in a direction opposite to the rotation direction of the second transmission gear 520 when the second transmission gear 520 rotates. The specific shape of the toothed unit 720 may be changed in design to various shapes such as helical gear teeth or spur gear teeth depending on the shape of the second transmission gear 520.

Figure 7:
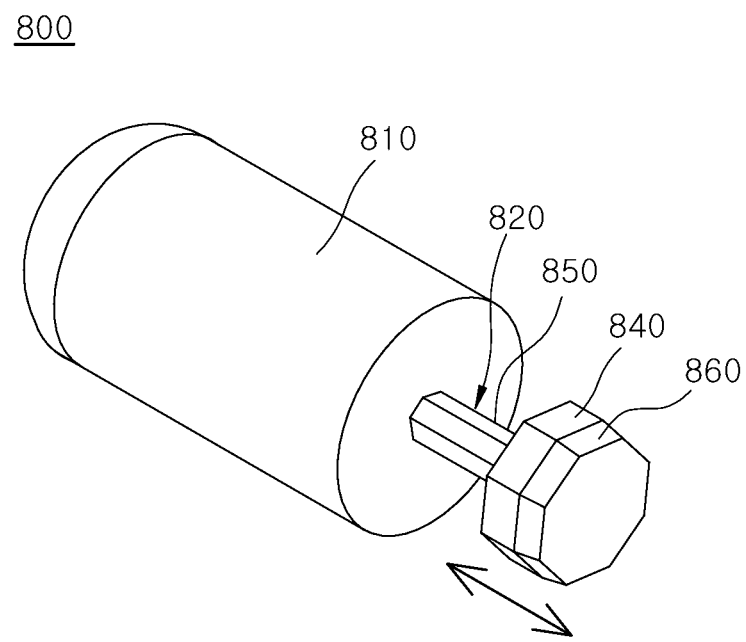
FIG. 7 is a perspective view schematically illustrating the configuration of the restriction unit according to the embodiment of the present disclosure.

The insertion structure 730 is concavely recessed into the body unit 710, and the restriction unit 800 to be described below is inserted into the insertion structure 730. The insertion structure 730 according to the embodiment of the present disclosure may be provided in the form of a groove concavely recessed from a rear portion of the body unit 710 in an axial direction of the body unit 710. The insertion structure 730 may have a polygonal cross-sectional shape. Therefore, when the restriction unit 800 to be described below is inserted into the insertion structure 730, it is possible to prevent the rotation of the insertion structure 730 relative to the restriction unit 800. FIG. 7 illustrates an example in which the insertion structure 730 has an octagonal cross-sectional shape, but the shape of the insertion structure 730 is not limited to the above-mentioned shape and may be changed in design to various shapes such as a quadrangular or hexagonal shape. The insertion structure 730 may have a width that decreases toward the inside of the body unit 710 so that the restriction unit 800 may be smoothly inserted into the insertion structure 730.

The restriction unit 800 is installed in the housing 300 so as to be reciprocatingly movable toward the parking gear 700. During the parking braking, the restriction unit 800 is inserted into the parking gear 700 and restricts the rotation of the parking gear 700. Therefore, the restriction unit 800 may prevent the piston 600 from being arbitrarily separated from the pad part 200 and thus inhibit a loss of braking force even though an operation of the drive unit 400 is released during the parking braking.

Figure 8:
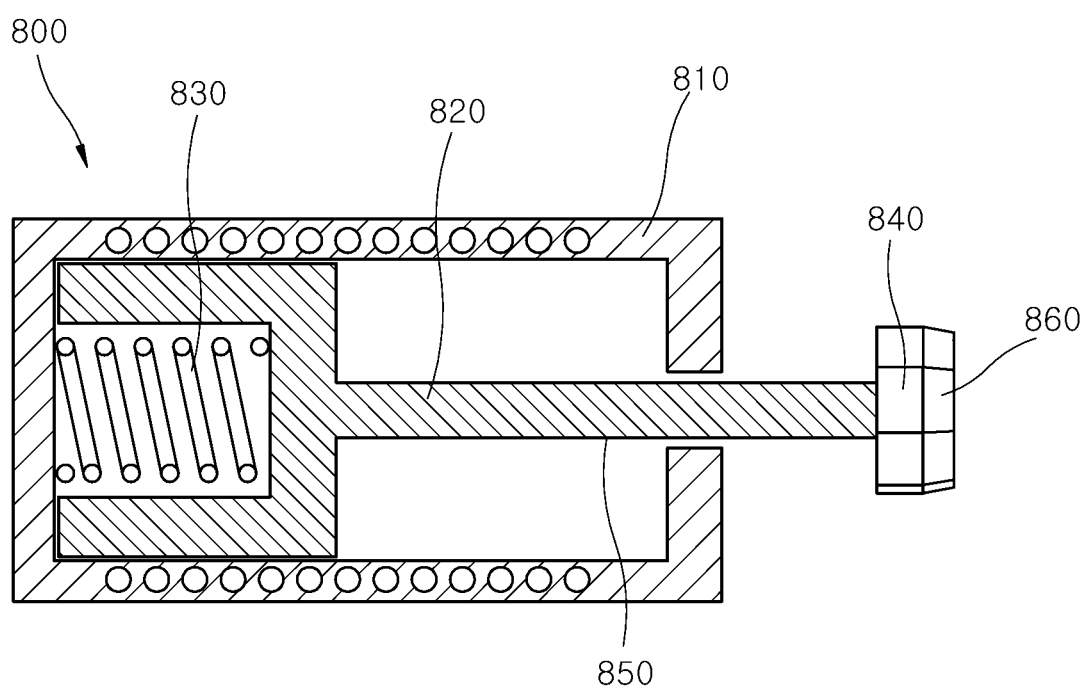
FIG. 8 is a cross-sectional view schematically illustrating the configuration of the restriction unit according to the embodiment of the present disclosure.

FIG. 7 is a perspective view schematically illustrating the configuration of the restriction unit according to the embodiment of the present disclosure, and FIG. 8 is a cross-sectional view schematically illustrating the configuration of the restriction unit according to the embodiment of the present disclosure.

Referring to FIGS. 7 and 8, the restriction unit 800 according to the embodiment of the present disclosure includes a parking drive unit 810, a rod 820, a restoration unit 830, a stopper unit 840, a rotation prevention unit 850, and an insertion guide unit 860.

The parking drive unit 810 generates an electromagnetic force by power applied from the outside. The parking drive unit 810 according to the embodiment of the present disclosure may have a hollow cylindrical shape. A longitudinal direction of the parking drive unit 810 is disposed in parallel with an axial direction of the parking gear 700, and a central axis of the parking drive unit 810 is disposed coaxially with a central axis of the parking gear 700. The parking drive unit 810 may be installed in the housing 300 or penetrate the housing 300. A front portion of the parking drive unit 810 faces the insertion structure 730 and is spaced apart from the insertion structure 730 at a predetermined interval. A spiral coil made of an electrically conductive material such as copper is wound in a longitudinal direction of the parking drive unit 810 and disposed between an outer peripheral surface and an inner peripheral surface of the parking drive unit 810. When the power is applied to the coil, the parking drive unit 810 generates the electromagnetic force therein in a direction parallel to the longitudinal direction.

The rod 820 is slidably installed in the parking drive unit 810. The rod 820 is moves to a first direction by the electromagnetic force generated by the parking drive unit 810. Hereinafter, the first direction will be described in which the rod 820 moves in a direction away from the parking gear 700 in response to the electromagnetic force generated by the parking drive unit 810. However, the rod 820 is not limited thereto and may move in a direction toward the parking gear 700 in response to the electromagnetic force generated by the parking drive unit 810.

The rod 820 according to the embodiment of the present disclosure may have an approximately rod shape. A longitudinal direction of the rod 820 is disposed in parallel with the longitudinal direction of the parking drive unit 810. A rear end of the rod 820 is inserted into the parking drive unit 810 and slidably supported by adjoining the inner peripheral surface of the parking drive unit 810. A front end of the rod 820 penetrates the front portion of the parking drive unit 810 and protrudes toward the parking gear 700. The rod 820 may be made of a ferromagnetic material such as iron so as to be movable in response to the electromagnetic force generated by the parking drive unit 810. When the parking drive unit 810 generates the electromagnetic force, the front end of the rod 820 moves in the direction away from the parking gear 700.

The restoration unit 830 is disposed between the rod 820 and the parking drive unit 810 and moves the rod 820 to a second direction when the electromagnetic force from the parking drive unit 810 is eliminated. The restoration unit 830 according to the embodiment of the present disclosure may be provided in the form of a coil spring elastically deformable in the longitudinal direction thereof. Two opposite sides of the restoration unit 830 are respectively fixed and supported by the rear end of the rod 820 and a bottom surface of the parking drive unit 810. When the rod 820 moves to one side, the restoration unit 830 accumulates an elastic restoring force while being compressed in the longitudinal direction. When the electromagnetic force from the parking drive unit 810 is eliminated, the restoration unit 830 applies the accumulated elastic restoring force to move the rod 820 to the second direction, i.e., in the direction toward the parking gear 700.

The stopper unit 840 is inserted into the parking gear 700 when the rod 820 moves to the second direction 700 by a predetermined distance or more. The stopper unit 840 according to the embodiment of the present disclosure is fixed to the front end of the rod 820 and faces the parking gear 700. A central axis of the stopper unit 840 is disposed coaxially with the central axis of the parking gear 700. When the rod 820 moves, the stopper unit 840 moves forward or rearward together with the rod 820 in the direction parallel to the axial direction of the parking gear 700. The stopper 840 may have a polygonal cross-sectional shape. Therefore, when the stopper 840 is inserted into the insertion structure 730, the stopper 840 may be coupled to and caught by the inner peripheral surface of the insertion structure 730 and stably restrict the rotation of the parking gear 700.

The rotation prevention unit 850 prevents the rotation of the rod 820 relative to the parking drive unit 810. The rotation prevention unit 850 according to the embodiment of the present disclosure has a polygonal cross-section and surrounds a front peripheral surface of the rod 820. The rotation prevention unit 850 may be integrated with an outer peripheral surface of the rod 820 or manufactured separately from the rod 820 and then coupled to the outer peripheral surface of the rod 820. The rotation prevention unit 850 is supported by adjoining the inner peripheral surface of the front portion of the parking drive unit 810 into which the front portion of the rod 820 is penetratively inserted. Therefore, when the stopper 840 is inserted into the insertion structure 730, the rotation prevention unit 850 may prevent the relative rotation of the rod 820 in the parking drive unit 810 due to the rotational force transmitted from the parking gear 700.

The insertion guide unit 860 guides the insertion of the stopper 840 into the parking gear 700.

Figure 9:
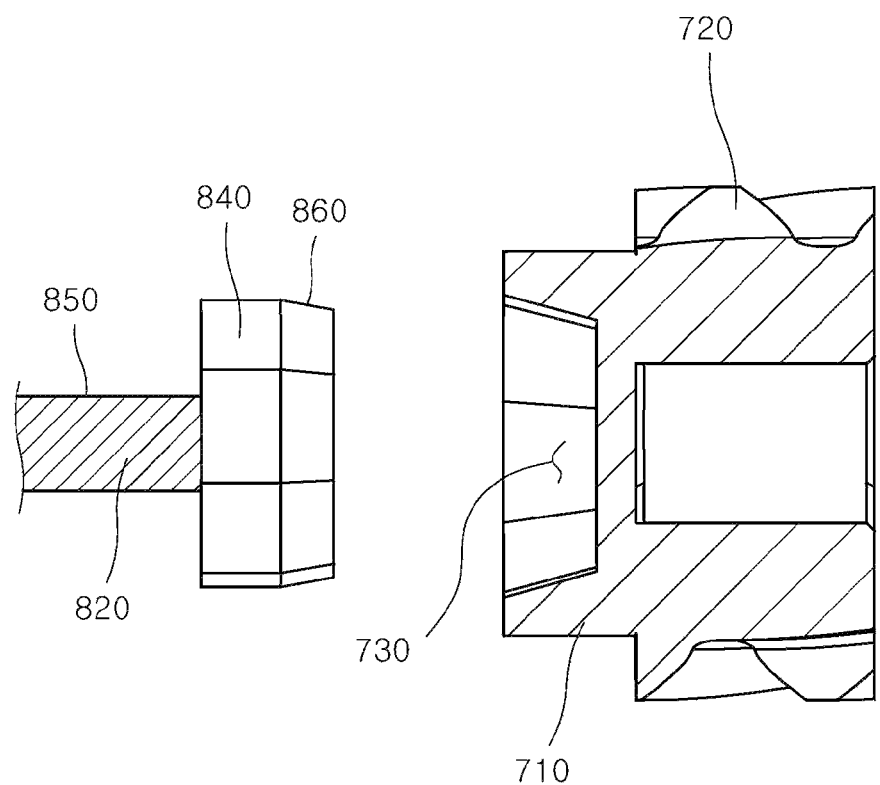
FIG. 9 is an enlarged view schematically illustrating a configuration of an insertion guide unit according to the embodiment of the present disclosure.

FIG. 9 is an enlarged view schematically illustrating a configuration of the insertion guide unit according to the embodiment of the present disclosure.

Referring to FIG. 9, the insertion guide unit 860 according to the embodiment of the present disclosure is disposed at an edge of an end of the stopper 840 and inclined at a predetermined angle. That is, the insertion guide unit 860 may be provided in the form of an inclined surface inclinedly extending from an edge of a front end of the stopper 840 toward a rear side of the stopper 840. The insertion guide unit 860 defines a closed curve by extending in a circumferential direction of the stopper 840. The insertion guide unit 860 has a width that increases toward the rear side of the stopper 840.

Hereinafter, an operating process of the brake apparatus 1 for a vehicle according to the embodiment of the present disclosure will be described in detail.

Figure 10:
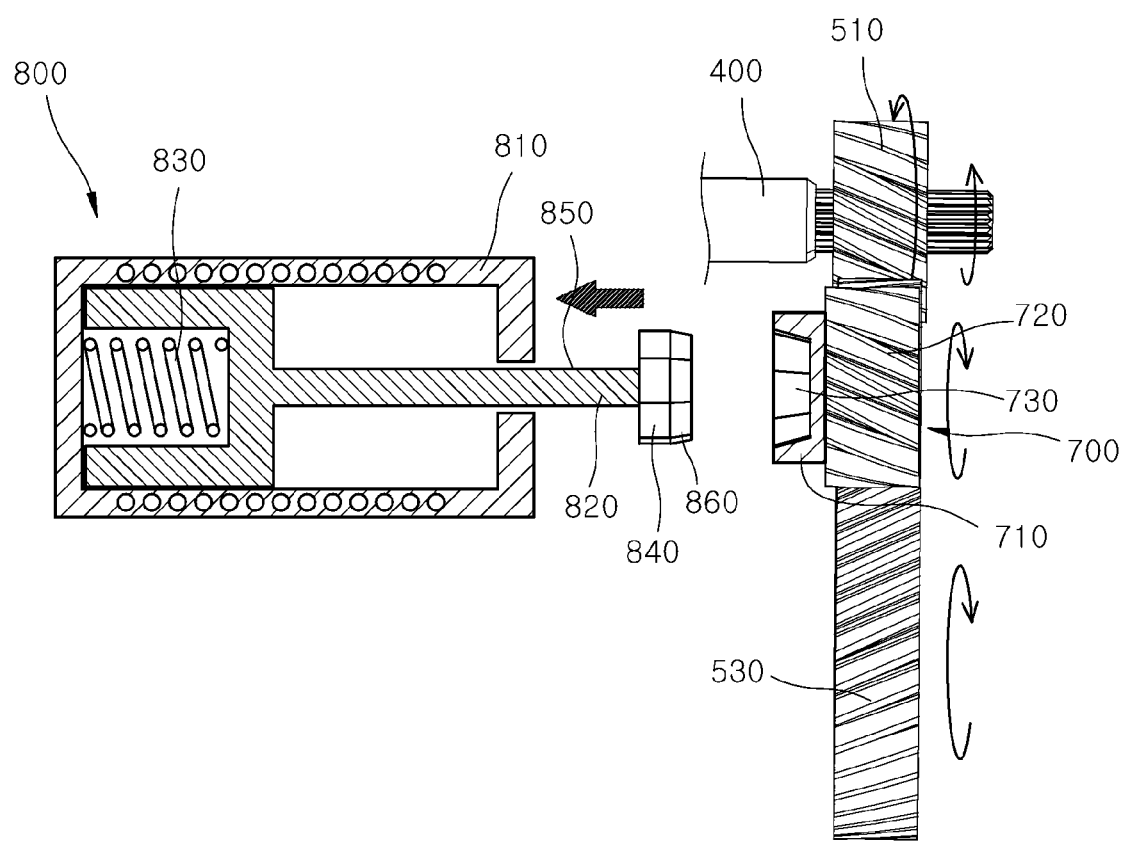
FIGS. 10 to 12 are operational views schematically illustrating an operating process of the brake apparatus for a vehicle according to the embodiment of the present disclosure.
Figure 11:
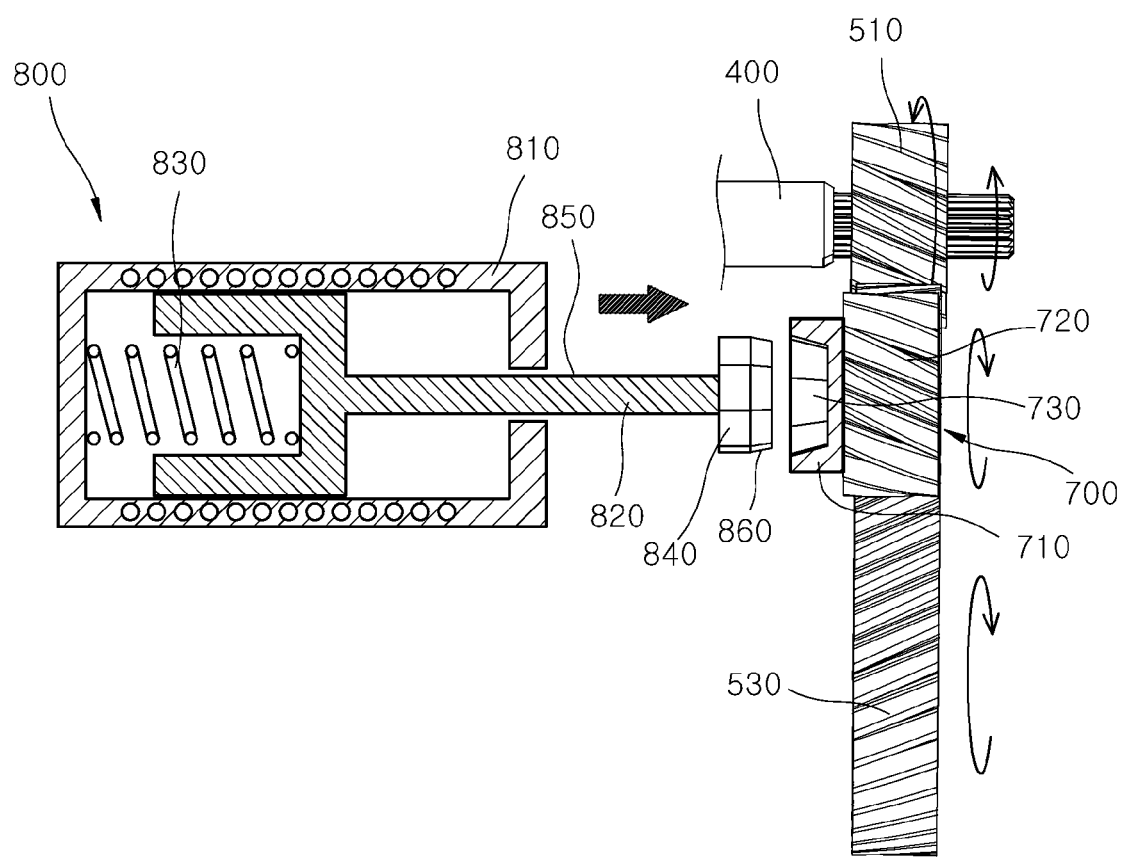
Figure 12:
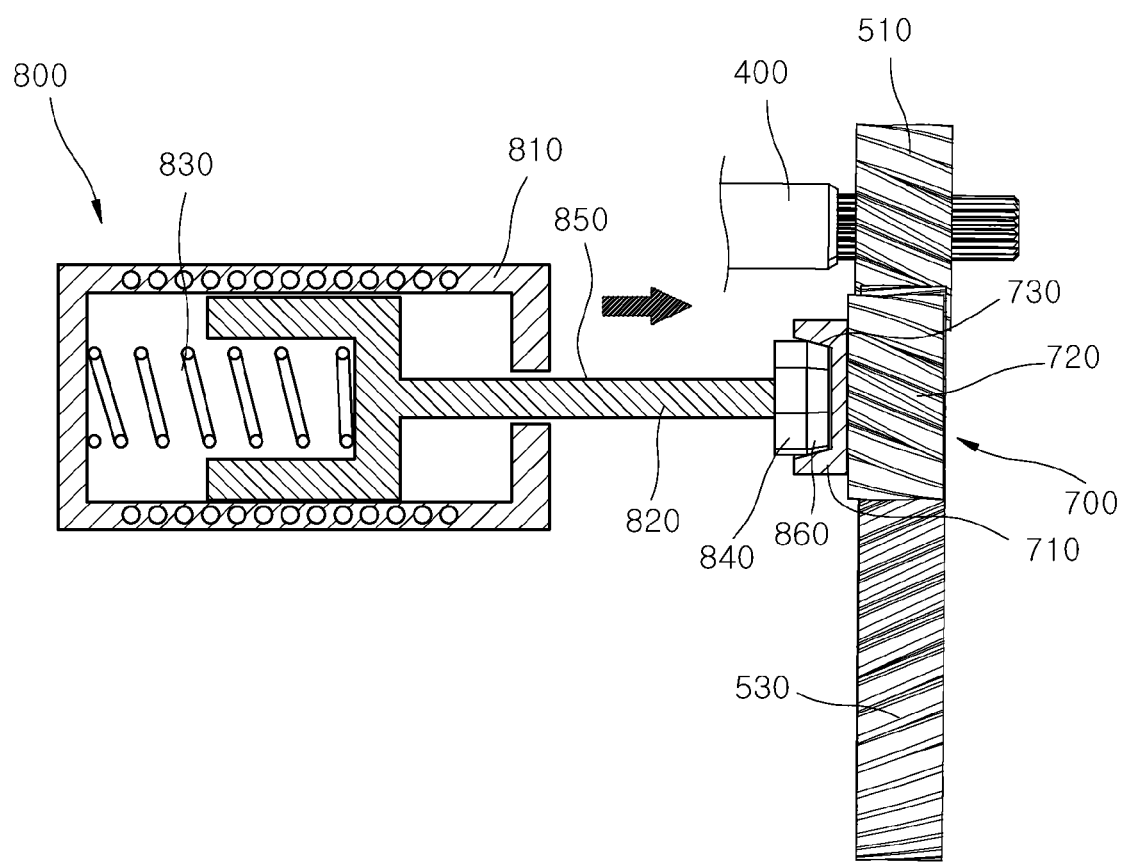

FIGS. 10 to 12 are operational views schematically illustrating an operating process of the brake apparatus for a vehicle according to the embodiment of the present disclosure.

Referring to FIGS. 1 to 12, the drive unit 400 generates the driving power and rotates the transmission gear 500 during parking braking of the vehicle.

The driving power generated by the drive unit 400 is transmitted to the ball screw 610 of the piston 600 sequentially through the first transmission gear 510, the second transmission gear 520, and the third transmission gear 530.

As the ball screw 610 rotates about the central axis thereof, the ball nut 620 moves forward by means of the circulation of the rolling element 630.

The piston member 640 moves forward together with the ball nut 620, comes into contact with the pad part 200, and presses the pad part 200 against the brake disc, thereby generating the parking braking force.

In this process, the rod 820 is moved in the first direction, the direction away from the parking gear 700 by the electromagnetic force generated by the parking drive unit 810, and the stopper 840 is kept separated from the parking gear 700.

Thereafter, when a sufficient parking braking force is generated, the parking drive unit 810 eliminates the electromagnetic force.

When the electromagnetic force generated by the parking drive unit 810 is eliminated, the restoration unit 830 applies the accumulated elastic restoring force and presses the rod 820 in the second direction, the direction toward the parking gear 700.

As the rod 820 moves toward the parking gear 700 by a predetermined distance or more, the stopper 840 is inserted into the insertion structure 730. In this case, the smooth insertion of the stopper 840 into the insertion structure 730 may be guided by the insertion guide unit 860.

Since the stopper 840 and the insertion structure 730 each have a polygonal cross-sectional shape, the outer peripheral surface of the stopper 840 and the inner peripheral surface of the insertion structure 730 are caught by and coupled to each other.

Thereafter, the drive unit 400 stops generating the driving power, and the rotational force, which is applied in a direction opposite to the direction of the rotational force transmitted during the parking braking, is transmitted to the parking gear 700 by the reaction force generated between the piston member 640 and the pad parts 200.

The catching/coupling force between the stopper 840 and the insertion structure 730 is offset against the rotational force and restricts the rotation of the parking gear 700.

Since the rotation of the parking gear 700 is restricted, the rotation of the transmission gear 500 engaging with the parking gear 700 is also restricted, which makes it possible to maintain the parking braked state.

While the present disclosure has been described with reference to the exemplary embodiment depicted in the drawings, the exemplary embodiment is described just for illustration, and those skilled in the art to the present technology pertains will understand that various modifications of the exemplary embodiment and any other exemplary embodiment equivalent thereto are available.

Thus, the true technical scope of the present disclosure should be defined by the following claims.

What is claimed is:

1. A brake apparatus for a vehicle comprising:
   a drive unit configured to generate a driving power;
   a transmission gear configured to be rotated by the driving power transmitted from the drive unit;
   a piston configured to (1) move along a first axis in response to a rotation of the transmission gear and (2) press or release a pad depending on a movement direction of the piston;
   a parking gear engaged with the transmission gear, and configured to be rotated in response to the rotation of the transmission gear; and
   a restriction unit configured to move toward and engage with the parking gear to restrict a rotation of the parking gear,
   wherein the restriction unit comprises:
      a parking drive unit configured to generate an electromagnetic force;
      a rod slidably movable in the parking drive unit, and configured to move in a first direction when the electromagnetic force is supplied thereto;
      a restoration unit positioned between the rod and the parking drive unit, and configured to move the rod in a second direction when a supply of the electromagnetic force is discontinued; and
      a stopper configured to be inserted into the parking gear when the rod moves in the second direction.

2. The brake apparatus of claim 1, wherein the transmission gear comprises:
   a first transmission gear configured to rotate along with an output shaft of the drive unit;
   a second transmission gear engaged with the first transmission gear and configured to rotate when the first transmission gear rotates; and
   a third transmission gear engaged with the second transmission gear and configured to rotate when the second transmission gear and transmit a rotational force to the piston.

3. The brake apparatus of claim 2, wherein the parking gear is engaged with the second transmission gear.

4. The brake apparatus of claim 3, wherein a diameter of the parking gear is smaller than a diameter of the second transmission gear.

5. The brake apparatus of claim 3, wherein a diameter of the parking gear corresponds to a diameter of the first transmission gear.

6. The brake apparatus of claim 3, wherein the parking gear comprises:
   a body unit;
   a toothed unit protruding from an outer peripheral surface of the body unit and engaged with the second transmission gear; and
   an insertion structure concavely recessed into the body unit, wherein the restriction unit is inserted into the insertion structure.

7. The brake apparatus of claim 1, wherein the restriction unit further comprises a rotation prevention unit configured to prevent a rotation of the rod with respect to the parking drive unit.

8. The brake apparatus of claim 7, wherein the rotation prevention unit has a polygonal cross-section and surrounds an outer surface of the rod.

9. The brake apparatus of claim 1, wherein the stopper has a polygonal cross-sectional shape.

10. The brake apparatus of claim 1, wherein the restriction unit further comprises an insertion guide unit configured to guide an insertion of the stopper into the parking gear.

11. The brake apparatus of claim 10, wherein the insertion guide unit is positioned at an end portion of the stopper and inclined at a predetermined angle.

12. The brake apparatus of claim 1, wherein the restoration unit is elastically deformable in a longitudinal direction thereof.

13. The brake apparatus of claim 1, wherein the piston comprises:
- a ball screw connected to the transmission gear and configured to rotate;
- a ball nut configured to rectilinearly reciprocate in a longitudinal direction of the ball screw in response to a rotation of the ball screw; and
- a rolling element positioned between and being in rollable contact with the ball screw and the ball nut.

* * * * *